Figures 1, 2:
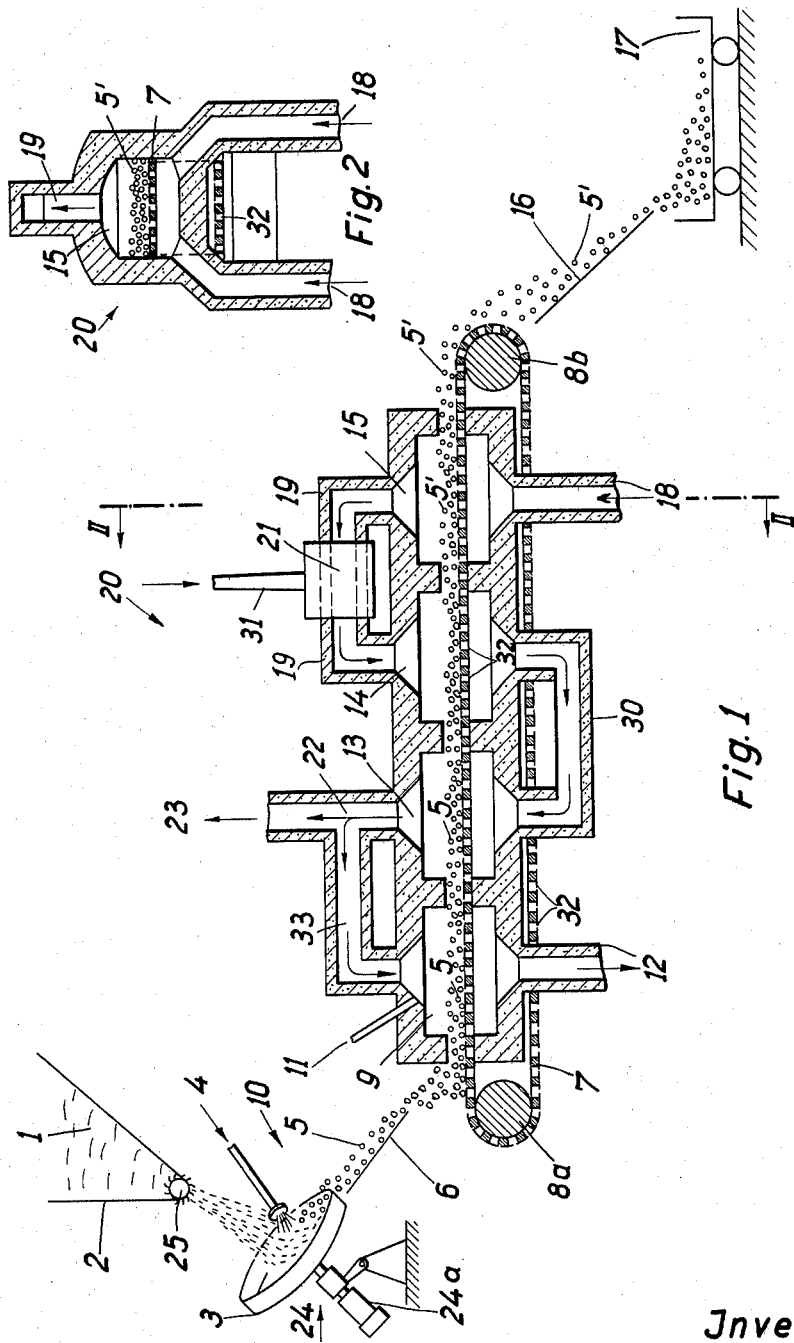

Inventor:
Ludwig von Bogdandy

United States Patent Office

3,214,264
Patented Oct. 26, 1965

3,214,264
TREATMENT OF METAL OXIDES
Ludwig von Bogdandy, Oberhausen, Rhineland, Germany, assignor to Huttenwerk Oberhausen Aktiengesellschaft, Oberhausen, Rhineland, Germany, a corporation of Germany
Original application Oct. 23, 1959, Ser. No. 848,287. Divided and this application Mar. 14, 1963, Ser. No. 274,885
1 Claim. (Cl. 75—5)

This application is a division of my copending application Ser. No. 848,287, filed October 23, 1959 and now abandoned.

My present invention relates to the treatment and processing of metal oxides and, more particularly, to the reduction of fine-grained metal oxides (e.g. iron oxide) to highly comminuted metallic (e.g. ferrous) powders.

Fine metallic powders of the type necessary for powder metallurgy, sintered-product manufactured and the like have heretofore been produced by the reduction of fine-grained metal oxides (e.g. of a particle size of approximately 0.15 mm.) in a variety of refining processes, generally involving the roasting of metal ores. One of the processes for the production of fine-grained iron powder from iron oxide includes the steps of sintering the oxide dust into briquettes or pellets with the aid of water or sulphite liquors, stacking the sintered bodies in vertically extending reaction chambers resembling cupola furnaces, and passing a reducing gas through the charge. While these reaction chambers present to the reducing gas large enough oxide surfaces and, for the most part, a porous mass, the briquettes or pellets tend to crumble under the influence of the stacked weight of the charge and the drying effect of the heat in the chamber. This crumbling action serves to reduce the porosity of the charge, and, therefore, the velocity of the gas passing therethrough and the speed of the reaction. Another disadvantage of this process resides in the tendency of the charge to weld together into a unitary mass, difficult of separation and requiring expensive handling apparatus.

Another process hitherto in operation involved the entrainment of the metal-oxide dust particles by a reducing gas whirled through a reaction chamber of the so-called "cyclone" type The reduced metal is withdrawn while the gas may be processed for re-use. In this process, there is a tendency for very minute particles of dust and metal to be withdrawn with the gas from the chamber. The separation of the particles from the gas stream requires expensive auxiliary equipment. This process is also limited by the temperatures and gas velocities permissible in the reaction apparatus. Changes in temperature, for example, require concurrent adjustment of the gas velocity to maintain the proper vortex configuration. To increase the output of this type of reaction chamber in view of the temperature limitations inherent therein, the reducing gas must often be introduced at pressures in the vicinity of 10 atmospheres, above 500° C., thus requiring complex and expensive equipment.

Other processes, including the continuous processing of sintered metal-oxide pellets, have been found to be inefficient in that the desired degree of reduction was not accomplished.

It is, therefore, an object of the present invention to provide a process for the reducing treatment of fine-grained metal oxides wherein a maximum reducing rate, output and efficiency may be obtained through the use of relatively inexpensive equipment.

Another object of the invention resides in the provision of simple and efficient means for continuously and completely reducing a fine-grained metal oxide to produce fine-grained metal powders.

A more specific object of the invention is the provision of means for utilizing the reducing gas to a maximum extent.

According to a feature of my invention, I provide a continuous process for the reduction of fine-grained metal oxides wherein the metal oxide is first agglomerated into pellets which are then carried on a conveyor through a plurality of processing chambers. The pellets, heaped on the conveyor to a level below that which would tend to cause crumbling or intemperate agglomeration of the pellets, pass directly from the agglomerating stage to a processing stage including a preheating chamber, one or more reducing chambers and a cooling chamber which the pellets traverse in succession before being discharged in a reduced metallic state.

In accordance with a more specific feature of the invention, the metal-oxide dust is formed into pellets of, say, 5 to 20 mm. average diameter by the admixture of water with the dust, the pellets being dried in the initial reaction chamber.

Another feature of the present invention is the provision of means whereby the oxidized reducing gas discharged from one of the reducing chambers is passed through the mass of pellets for the purpose of heating and drying the latter.

Still another feature of the invention resides in the provision of means whereby a cold gas such as methane is passed through the hot reduced charge at right angles to the advance of the pellets, the cold gas being heated thereby and then being passed through a catalyzation chamber wherein it is further heated to the reducing temperature and converted into a reducing gas, such as a mixture of $H_2$ and $CO$, in the presence of a catalyst.

The above and other objects, features and advantages of my present invention will become more readily apparent from the following detailed description, reference being made to the accompanying drawing in which:

FIG. 1 is a somewhat schematic longitudinal sectional view of a metal-oxide-reducing plant according to the invention; and FIG. 2 is a cross-sectional view taken along line II—II of FIG. 1.

In FIG. 1 I show a plant for reducing fine-grained metal oxides, comprising an agglomerating stage 10 and a processing stage 20. The agglomerating stage 10 consists of a hopper 2 adapted to dispense a fine-grained oxide powder (up to about 0.15 mm. grain size) 1 passing between a distributing roller 25 and the hopper outlet. The powder 1 falls onto the table 3 of a rotary pelletizer 24 driven by a motor 24a. From the pelletizer 24, pellets 5 formed by the rotary action of table 3 on the powder 1, upon the dampening thereof by a fluid such as water sprayed onto the pelletizer table 3 from a spray nozzle 4, are carried over a feeder plate 6 onto a chain conveyor 7 of the processing stage 20. The chain 7 passes over a pair of conveyor rollers 8a, 8b, driven by a motor (not shown), and carries the green, damp pellets 5 successively through a pre-heating and drying chamber 9 having an air inlet 11, a pre-reducing chamber 13, a reducing chamber 14 and a cooling chamber 15, thereafter depositing the reduced metal pellets 5' via a discharge plate 16 on a truck 17. The cooling chamber 15 is provided with an inlet pipe 18, connected to a source of a cool gas, and with an outlet pipe 19 which simultaneously serves as an inlet to the reducing chamber 14. The outlet from chamber 14 is a pipe 30 adapted to convey the outgoing gas into the pre-reducing chamber 13 whose outlet pipe 22 is connected to the pre-heating and drying chamber 9, by a pipe 33, and to a waste-gas outlet 23. The chamber 9 is further provided with a gas-outlet pipe 12. Between chambers 14 and 15 along pipe 19, I advantageously position a catalyzation chamber 21 provided with a reactant source 31 and a plurality of contact plates (not shown).

The moist, green pellets 5 received from the agglomeration stage 10 are carried into the pre-heating chamber 9 in which they are dried and heated to the reduction temperature of between 700° C. and 100° C. (for iron oxide) by the flow of hot gas from the reducing chambers, or by a hot-air blast from pipe 11, this gas passing in a downward direction through the charge from inlet 33 to outlet 12. The discharged gas stream will thus be laden with the moisture formerly contained in the green pellets. The pellets are advantageously stacked upon the conveyor chain 7, which is perforated as shown at 32 in FIGS. 1 and 2 to permit the passage of the gas therethrough, to a height (e.g. up to 50 cm.) sufficient to permit large quantities of oxide to be processed but low enough so as not to cause crumbling due to the pressure of the upper tiers of pellets upon the lower tiers. The dried and hot metal-oxide pellets are carried into the pre-reduction chamber 13 where, from beneath, they are contacted with a reducing gas only partially oxidized in the succeeding reducing chamber 14 and passing therefrom through pipe 30, through the spaces 32 in the conveyor chain 7 and through the interstices of charge 5 out through pipe 22 into the drying chamber 9. The charge is thus reacted with the hot reducing gas and is, therefore, partially reduced to a metal which under the influence of the high temperatures remains agglomerated in the form of metal-powder pellets 5'. The charge moves thereafter into reducing chamber 14 wherein a fresh reducing gas produced in the catalyzation chamber 21 is passed from above through the charge to convert the remaining oxide to metal at an efficiency of over 95%. The reaction rate in this process is extremely rapid and complete, owing to the temperature of gas and charge, and to the efficiency of surface contact therebetween. The partially oxidized gas then passes through pipe 30 to the pre-reduction chamber 13 as previously described. In cooling chamber 15, a cool gas such as methane passes through the charge from beneath, becoming pre-heated thereby while simultaneously cooling the latter prior to the discharge of the pellets over plate 16 onto transport truck 17. The truck may now carry the pellets of reduced metal to a crushing and grinding apparatus, not shown, for further processing.

The hot methane gas is passed over a suitable catalyst such as nickel in the catalyzing chamber 21 and, upon reaction therein with a high-temperature water vapor introduced at 31, is converted to water gas (carbon monoxide and hydrogen) which serves as the reducing gas in chamber 14. By using other catalysts, oxygen may be preferentially reacted with the methane in a manner known per se to produce the reducing gas. On account of the high temperatures of the gas in the reducing chambers the reduced metal is sintered, to a greater or less extent, simultaneously with the reduction of the oxide to the metal to produce, automatically, pellets adapted to withstand crumbling tendencies. The cool gas introduced into the cooling chamber 15 may be a reducing gas, should it be desired to eliminate the catalyzation chamber, since the reduced metal pellets 5' in the cooling chamber would have little tendency further to reduce or, similarly, to oxidize part of the gas. It will be apparent that the consistent passage of the gas cross-current to the travel of the conveyor 7 enables the entire apparatus to be rendered highly compact.

Although the invention has been described with reference to a multi-chambered processing stage having a pair of reduction chambers, it will be readily apparent to persons skilled in the art that the oven may be provided with additional reduction or other processing chambers, should it be desired to increase the yield, or the gas utilization. Other types of pelletizers may be used and further modifications in structure may be made without departing from the spirit and scope of my invention, except as further limited by the appended claim.

I claim:

A process for reducing a fine-grained metal oxide, comprising the steps of agglomerating the metal oxide in the presence of moisture into green pellets, and successively preheating, drying and reducing said pellets by advancing the green pellets linearly in a substantially horizontal layer in a single heat countercurrent to a hot gas stream passed through said layer a plurality of times from opposite sides at right angles to the direction of advance of said pellets, said gas stream containing methane and initially passing through a hot downstream portion of said layer thereby cooling said downstream portion while said stream is heated by said pellets, further comprising the steps of catalytically reforming said methane to carbon monoxide and hydrogen subsequent to its passage through said downstream portion, and thereafter passing the gas stream containing hydrogen and carbon monoxide through said layer at a location upstream of said portion and at a right angle to the direction of advance of said pellets for reducing said metal oxide at said location.

References Cited by the Examiner

UNITED STATES PATENTS

| | | | |
|---|---|---|---|
| 1,832,731 | 11/31 | Pardee | 75—5 |
| 2,445,648 | 7/48 | Truesdale | 75—34 |
| 2,511,400 | 6/50 | de Jahn | 75—34 |
| 2,577,730 | 12/51 | Benedict et al. | 75—35 |
| 2,739,055 | 3/56 | Gallusser | 75—34 |
| 2,750,272 | 6/56 | Lellep | 75—3 |
| 3,005,699 | 10/61 | Erck et al. | 75—35 |

FOREIGN PATENTS

| | | |
|---|---|---|
| 364,699 | 1/32 | Great Britain. |

BENJAMIN HENKIN, *Primary Examiner.*